May 21, 1940.   H. R. LUBCKE   2,201,295
SYSTEM OF TELEVISION SYNCHRONIZATION
Filed Jan. 24, 1938
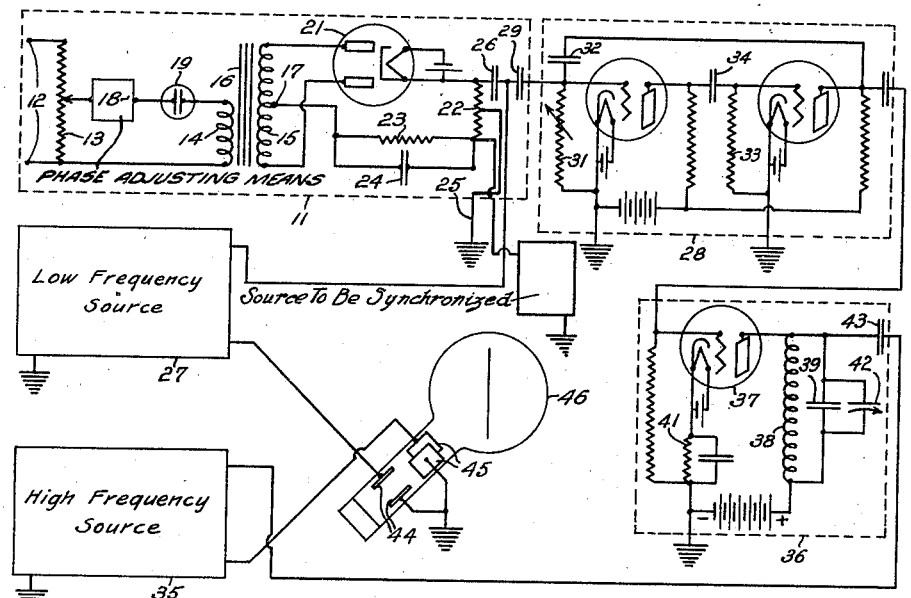
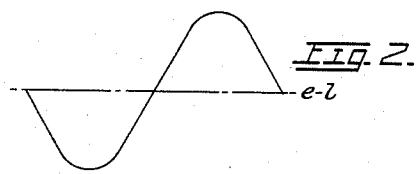
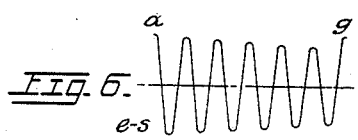
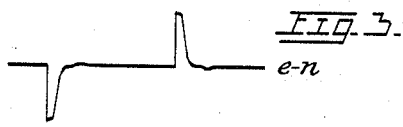
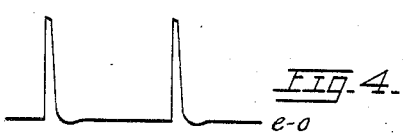
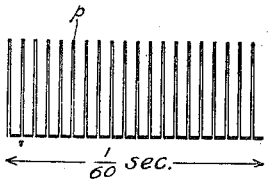
Inventor;
Harry R. Lubcke,
by Arthur J. Farnsworth.
Attorney.

Patented May 21, 1940

2,201,295

UNITED STATES PATENT OFFICE 2,201,295

SYSTEM OF TELEVISION SYNCHRONIZATION

Harry R. Lubcke, Los Angeles, Calif., assignor to Don Lee Broadcasting System, Los Angeles, Calif., a corporation of California Application January 24, 1938, Serial No. 186,567

7 Claims. (Cl. 178—69.5)

My invention relates to methods and means for synchronizing alternating electrical energy sources having differing waveforms; and especially to methods and means for holding a plurality of electrical energy sources of differing waveforms, in fixed time relation to another source, of still another waveform. In the application of the invention to television, for example, said plurality of energy sources may include the means employed for the high and low frequency scannings; and the other source, of still another waveform, may be the alternating current power supply.

Oscillators for producing alternating electrical energy of high frequency; and means for keeping a chain of such oscillators, of successively lower frequency, in step with the oscillator of the highest frequency; are well known. The high frequency oscillator of such a series often is operative at the high scanning frequency employed in television; and the lowest frequency oscillator of the chain may be operative at the low scanning frequency thereof; but, hitherto, no means have been devised for maintaining such a system of oscillators in synchronism with commercial alternating current power.

Other prior systems have provided means for combining the energy of the lowest frequency oscillator with that of commercial alternating current power, and for utilizing the resultant, usually rectified, to influence the frequency of the high frequency oscillator of the chain. Such processes have been those of frequency de-multiplication or division, following the art employed in radio frequency measuring equipment.

Still other prior systems have made use of frequency multiplication, by means of over-excited, or push-pull, vacuum tube amplifiers, such as those employed in radio frequency transmitter practice.

The methods of the present invention involve certain principles which have not been recognized in the prior art. I have discovered for instance, that certain types of oscillators, such as those described in my United States Patents 2,047,277 and 2,075,818, will operate synchronously with another oscillator which emits a short pulse only once every ten or more oscillations. This discovery opens up a new field for frequency multiplication; and the provision of practical means for utilizing it, is one of the principal objects of the present invention.

Another principal object of the present invention is provision of means for producing a short pulse from commercial alternating current waveforms.

Accomplishment of the aforesaid two principal objects, and utilization of these two accomplishments in combination, provides a new and complete means for synchronizing television systems with commercial alternating current power systems; and provision of the last said means is a third principal object of the present invention.

A fourth object of this invention is to provide resonant means adapted to operate as "sustainers" of the pulsating energy, used for synchronizing interconnected oscillators.

Further objects and advantages of the present invention will be set forth, or will become apparent in the light of the following disclosure.

All of my objects have been attained in the manner illustrated in the accompanying drawing, in which—

Figure 1 shows, diagrammatically, a complete synchronizing arrangement for a cathode ray television system, embodying my present invention; and Figures 2 to 7 inclusive, show various wave forms of electrical energy which occur in the operation of the system diagrammed in Fig. 1.

Reference numerals in the drawing have been used but once, since each designates but a single showing.

Before passing to a detailed description of my invention, I wish it to be understood that I do not limit myself to the specific embodiments herein disclosed. Possible variations therefrom will, or may, become evident from the teachings herein, and are included within the scope of the present invention.

With reference to Fig. 1 of the drawing, the dotted-line rectangle 11 encloses the representation of that part of my equipment which is called the synchronizing rectifier. This apparatus functions to produce short pulses from quasi-sinusoidal alternations in a power supply source connected to its input terminals at 12. Such power source usually is the 110 volt, 60 cycle, single-phase line of a public utility operating in the neighborhood; and this same utility preferably supplies energy to all co-acting apparatus, such as television receivers in private homes. This desideratum is not because synchronization between the transmitting and receiving stations is accomplished over the utility's network; but in order that residual "hum," and similar disturbances, will be stationary on the receiver screens, and therefore least noticeable. The electrical energy input at 12, may be of any voltage, frequency, or waveform, and it may be derived from any source, without departing from the scope of this invention.

The device 13 is a potentiometer for the purpose of adjusting the working voltage input, to secure the best results for the operation of subsequent apparatus. Elements 14 and 15 respectively are the primary and secondary windings of a step-up transformer, the core thereof being indicated at 16. This transformer increases the voltage taken from potentiometer 13, for application to the subsequent apparatus, to thereby assure a large voltage output from the latter; isolates the subsequent apparatus from the power supply; provides a balanced alternating voltage with respect to a third terminal 17, for full wave rectification; and may alter the waveform of the electrical supply, as will be shown later.

Element 18 is a diagrammatic representation of suitable phase-adjusting means. It may have shunt as well as the implied series elements, and is for the purpose of changing the phase of the energy flowing through the subsequent apparatus, with respect to that of the power supply line.

Element 19 is a gaseous discharge device, which may be a commercial neon glow lamp. This is one of the means I provide for producing a short pulse from the sinusoidal power input. Potentiometer 13 is adjusted until the neon lamp glows, and so that a lower adjustment (giving a lower working voltage) will extinguish the lamp. Such an adjustment gives the maximum sharp-pulse output from the synchronizing rectifier, but it is not critical.

Illustrative waveshapes of the alternating energy at various parts of the synchronizing rectifier are shown in Figs. 2 to 4 inclusive. A sine wave, representing the voltage wave of the incoming power at terminals 12, is shown in Fig. 2 at $e-l$. Fig. 3, directly below and drawn to the same time scale without phase adjustment, shows the voltage waveform appearing across primary coil 14 of the transformer. This waveform is designated $e-n$. In effect, neon lamp 19 operates as a switch, controlled by the amplitude of the sine wave $e-l$, and passes energy for only a short portion of each half cycle thereof.

It will be noted that the non-oscillating switch-functioning of the neon lamp is quite different from hitherto known arrangements, wherein a glow-lamp oscillator is synchronized to the power supply line.

The small pulse which follows each sharp pulse shown in the curve $e-n$, is of no consequence in practical operation, and it merely happened to be present in the particular embodiment from which data was obtained for the various waveforms herein exhibited.

The pulse waveform $e-n$ is increased in amplitude, rectified, and further sharpened, by the not as yet described apparatus within dotted rectangle 11.

The voltage waveform appearing across the terminals of secondary coil 15 is increased in magnitude. This voltage is impressed upon the anodes of a full wave rectifier 21, which may be either a high vacuum or mercury vapor device. The cathode of this rectifier is connected through a resistor 22 to the parallel resistor-condenser combination 23—24, the other terminals of which are connected to a center tap 17 of the secondary coil of the transformer, to complete the circuit. With ground connection 25 made at the junction of elements 22, 23 and 24 as shown, a positive synchronizing pulse, represented by the curve $e-o$ of Fig. 4, is secured at the output condenser at 26.

Certain devices which it may be desired to synchronize by means of the synchronizing rectifier described, work best with negative synchronizing pulses, as will be explained later. In such circumstances, negative pulses may be secured by interchanging ground and output connections 25 and 26.

As heretofore stated, the full wave rectifier 21 rectifies the waveform $e-n$, placing all of the pulses on one side of the axis as in waveform $e-o$, and the latter waveform appears at output connection 26 of the synchronizing rectifier indicated generally by dotted rectangle 11. The resistor-condenser combination 22, 23, 24 contributes to the sharpening of the pulses of waveform $e-o$. The condenser 24 is a capacitative load on rectifier 21. As such, it takes current from the rectifier only when the voltage output thereof is greater than its own potential, and this condition occurs only during the peak of the voltage waveform impressed upon the rectifier. Resistor 23 is shunted across condenser 24, to partially discharge the latter during the interval between voltage peaks. This is required because otherwise the condenser would remain charged to the peak value of the rectifier voltage, and the desired current pulses would not flow. Resistor 22 causes a voltage pulse to appear between output connection 26 and ground; for each current pulse that flows through circuit 15, 21, 22 to charge condenser 24. This last said voltage pulse is that shown in the output voltage waveform $e-o$.

For 60 cycle power input, and the circuit illustrated and described, resistor 22 may be made 2 megohms or less, resistor 23 about 200,000 ohms, and condenser 24 about one-half microfarad.

Two means have been described for sharpening the pulse of waveform $e-n$ to that shown in waveform $e-o$; i. e., the gaseous switch 19, and the resistor-condenser network 22, 23, 24. Either of these means may be omitted, and yet pulses of approximately the same sharpness may be secured. When utilizing switch 19 only, elements 23 and 24 are short-circuited by a conductor. When utilizing the charge-pulse elements 22, 23, 24 only, switch 19 is short-circuited by a conductor, and the value of resistor 22 preferably is reduced to a few thousand ohms. With the latter arrangement, the output of the synchronizing rectifier, indicated generally by dotted rectangle 11, is adapted for series connection to the device to be synchronized, rather than the shunt connection herein illustrated.

A further means for sharpening the voltage pulses, which is particularly useful when switch 19 is omitted, consists in designing transformer 14, 15, 16 in such a manner that a peaked voltage wave will be secured at the terminals of its secondary coil 15, although the usual quasi-sinusoidal power input is applied to its primary coil 14. This may be accomplished by making the exciting current relatively large. When this is done, the portion of the half cycle during which the rectifier voltage is above that of condenser 24 is shortened, and the voltage difference is thus increased. Consequently, for both of these reasons the charging current pulse is sharpened, and so also are the voltage pulses.

It will be remembered that the production of sharp synchronizing pulses, from a commercial alternating current power input, was one of the principal objects of the present invention; and it will be understood that the sharp pulse output of the entire device indicated by dotted rectangle 11, may be utilized in many ways. It may be employed, for example, for actuating a stroboscopic lamp, an electric shutter, and various electromechanical devices. With 60 cycle power frequency, the pulses shown in curve e—o occur 120 times per second, and are suitable for synchronizing equipment operating at either a multiple or sub-multiple of this frequency.

In Fig. 1, the output of the synchronizing rectifier indicated by the dotted rectangle 11, is shown connected, through condenser 26, to a source of low frequency energy. The latter is indicated by rectangle 27, and may be for low frequency television scanning. The synchronizing rectifier is also shown as being connected to another device, indicated generally by dotted rectangle 28, through another condenser 29.

The low frequency energy source indicated at 27, may be of either type disclosed in my United States Patents 2,047,277 and 2,075,818; or of any other type having similar synchronizing characteristics. Such a source may be adapted to operate at a frequency of 12, 24, 30, 40, 60, or any other which is an integral multiple or sub-multiple of 120. If it operates at 24 cycles, there will be five synchronizing pulses for each cycle of operation of the device.

In connection with the present phase of this discussion, it is important to note that experience has shown that four improperly timed pulses do not result in false synchronization, nor do they interfere with proper operation, of the secondary device. True synchronization, will take place on the fifth pulse.

The positive pulses e—o, secured by means of the connections shown in Fig. 1, are adapted to synchronize the source shown in my United States Patent 2,047,277; when the herein described rectifier is connected to the grid thereof, or to a tap on the grid resistor. The herein described rectifier may also be connected to the grid of the first tube of the source shown in my United States Patent 2,075,818.

Negative pulses, the inverse of those shown at e—o, secured by interchanging connections 25 and 26 as stated above, are adapted to synchronize the source shown in my United States Patent 2,047,277, when applied to the third grid thereof; and to synchronize the source shown in my United States Patent 2,075,818, when applied to the anode of the first tube, or to the grid of the second tube thereof.

Positive pulses may be secured for synchronizing one source, and negative pulses for synchronizing another source, by attaching ground connection 25 to the center of resistor 22, and taking off the desired polarity of pulses from the respective extremities of resistor 22. Such a connection secures the advantage of reducing interaction between sources, when any exists.

The device shown within dotted rectangle 28 is a two-tube multivibrator; adapted for producing a waveform of unequal half-cycle periods, at a frequency which is a multiple of the synchronizing rectifier frequency. When used in connection with the scanning of a 300-line sequentially scanned image, repeated 24 times per second, the high scanning frequency thus being 7,200 cycles, the device within dotted rectangle 28 conveniently operates at 1200 cycles per second. Hence it may be synchronized once each 10 cycles, by the 120 cycle pulses e—o; the latter being impressed through the condenser 29, which is of small reactance to the frequencies involved.

It is possible to produce pulses e—o which last only 10% of the interval between successive pulses, by the methods heretofore described. A synchronizing pulse of this kind lasts during only one of the 1200 cycle intervals. Although this may be desirable, it is not necessary; and pulses lasting 15% of the interval between successive pulses are practically satisfactory. Such 1200 cycle pulses, drawn to the same time scale and phase as the 120 cycle pulses of the e—o curve directly above it, are indicated in Fig. 5 at e—m.

Waveform observations with respect to apparatus of the kind last described, have shown that the mechanics of operation are as follows:

The 1200 cycle device, illustrated as within dotted rectangle 28, tends to operate at the natural frequency for which it has been adjusted. Once each 10 cycles of its operation, it is synchronized by a pulse from the synchronizing rectifier, which restores its frequency to 1200 cycles when considered over an interval of time of $\frac{1}{120}$ of a second or more. This is accomplished by accelerating the occurrence of the 1200 cycle pulse which is synchronized by the 120 cycle pulse. The time interval between the ninth and tenth pulse is thus somewhat less than that between any of the eight preceding pulses. By adjusting the natural period of the 1200 cycle device, by varying resistor 31, the natural period may be made so nearly an exact multiple of the power supply frequency, that all of the 1200 cycle pulsations are equally spaced. Tests on a complete television image channel have shown that it is possible to purposely vary the value of resistor 31, by a few per cent, without it being possible to detect any change in the appearance of the television image transmitted with its assistance.

The time constant of the resistor-condenser combination 31—32 determines the duration of the pulse. The values of these elements may be 250,000 ohms and 50 micro-microfarads respectively. The time constant of resistor-condenser combination 33—34 determines the duration of the interval between pulses, and these elements may have the values 400,000 ohms and 1500 micro-microfarads respectively.

By the process described, the 1200 cycle output e—m may be impressed upon, and caused to synchronize, a high frequency source operating at 7,200 cycles per second, such as is indicated generally by rectangle 35. Each sixth alternation of the high frequency source may thus be synchronized. It has been found, however, that a supplementary device called a "sustainer" is useful at this point.

Such a sustainer is indicated as being within dotted rectangle 36. In this the vacuum tube 37 tends to amplify the waveform e—m. The resonant circuit 38—39, in the anode circuit of the tube 37, presents an appreciable impedance only to oscillatory energy of the frequency that it is desired to synchronize, which, in this case, is 7200 cycles. It produces a damped wave train of the kind shown in Fig. 6 at e—s. The cathode bias resistor 41 is made of large value, or a grid bias battery may be employed, so that the anode current of tube 37 is small or zero during the intervals between the pulses of wave form e—m. Thus the damping of the resonant circuit by anode current flow, is made negligible. Only when the actuating pulse p swings the grid toward or into the region of positive grid polarity, does anode current flow.

Pulse portion p of waveform e—m, is made to have a strong component of energy at 7,200 cycles, by proportioning the period of the pulse to the period of interval, in the ratio of one to six. This is accomplished by adjusting the time constants of combinations 31—32 and 33—34, while observing the waveform. At the instant that the pulse passes through sustainer 36, the maximum amplitude of waveform e—s occurs, as shown at a in Fig. 6. Successive alterations of the energy of the resonant circuit will be of decreasing amplitude, until the next pulse occurs at g. By making resonant circuit 38—39, of the sustainer, one of low losses, and adjusting it to be closely tuned to the desired frequency, the decrease in amplitude of successive alternations shown in curve e—s, may be made small.

It is desirable to make coil 38 of the honeycomb type, wound with reasonably large wire. Condenser 39 may be of good mica construction. A variable air condenser 42 is provided, for adjustment of the circuit to minimum decrement under final operating conditions. The output of the sustainer passes through a condenser 43, which is of small reactance to the frequency of 7,200 cycles, and is impressed upon high frequency source 35, at the synchronizing connection thereof.

The waveform e—c of Fig. 7, is illustrative of the output of high frequency source 35, and is drawn to the same time scale as curve e—s directly above it; i. e., to the scale of $1/1200$ of a second.

The outputs of the low and high frequency sources may be applied to the respective pairs of deflection plates, 44 and 45, of a mosaic camera tube 46; to the respective pairs of deflection plates of a cathode-ray tube; or they may be otherwise utilized in any desired manner. By adding high current amplifiers to sources 27 and 35, they may be used for deflecting electron streams by means of deflection coils.

It will be understood that the several means described herein may be employed at more than one point, to afford desired refinements. The quasi-sine wave e—s of the sustainer output, may be impressed upon a gaseous switch lamp, or upon a peaking transformer, to provide sharp pulses for the 7,200 cycle synchronization. Also, two devices 28 may be employed; one operating, say, at the fifth harmonic of 120 cycles, or 600 cycles; and the other at the fourth harmonic of 600 cycles, or 2400 cycles. With such an arrangement, high frequency source 35 will be synchronized each third cycle; and the sustainer either will operate with great efficiency if retained, or it may be omitted.

Having thus fully disclosed my invention, I claim:

1. The method of synchronizing a plurality of scanning sources which are adapted to coact to scan a television field of view, with each other and with a source of reference frequency, said method consisting in; producing from said reference frequency a series of short rectangular impulses harmonically related to said frequency, and applying said impulses to a scanning source of said plurality of relatively low operating frequency; synchronizing a chain of oscillators of rectangular waveshape characteristics of progressively higher frequency, by impressing short rectangular pulses thereupon in turn, at an amplitude not greater than the amplitude of the oscillation occurring therein, thereby periodically adjusting the frequency of the next higher frequency oscillator; and impressing the output of last said oscillator upon a scanning source of said plurality and relatively high operating frequency.

2. In television synchronization, means for synchronizing a plurality of alternating electrical energy scanning sources of quasi-rectilinear waveforms and of different frequencies, which are adapted to coact to scan an area, said means including; a connection to a quasi-sinusoidal alternating electrical energy supply; means for producing one series of short unidirectional impulses from said supply; means for synchronizing one of said plurality of scanning sources with said supply; an oscillator of rectangular waveshape and of higher oscillation frequency than that of the recurrence of said unidirectional impulses; means for synchronizing said oscillator by said impulses, the amplitude thereof not being greater than the amplitude of the oscillation of the oscillator; a circuit resonant at a harmonic of the operating frequency of said oscillator and connected thereto; and means for synchronizing another of said plurality of scanning sources by impressing the output of said resonant circuit thereupon.

3. Means for synchronization comprising; a self-oscillatory circuit which is adapted for producing a series of short rectangular impulses at a given frequency; a synchronizing source adapted for producing similar waves of a harmonically related lower frequency; and means for applying the produced wave of said synchronizing source to the self-oscillatory circuit at an amplitude not greater than the oscillations thereof, for keeping the frequency thereof at said given frequency.

4. In combination; an impedance; means for applying a peaked quasi-rectilinear synchronizing wave across said impedance; an intermediate tap on said impedance; a plurality of sources of alternating current; and means for synchronizing said sources of alternating current to said synchronizing wave, including means for coupling said sources to opposite sides of said tap on said impedance.

5. In combination; means for synchronizing a plurality of alternating current sources to a third source comprising; a transformer having an input and output connection; means for applying a wave to said input connection; a rectifier circuit connected across the output connection of said transformer; a capacitative load on the rectifier; a resistive load in shunt with the capacitative load; and an impedance having an intermediate terminal; the size of said resistance load being such, in relation to the size of the capacitative load, that impulses of a frequency of the order of the applied wave appear in said impedance, said capacitative load and said impedance being in series to said rectifier circuit; a plurality of alternating current sources to be synchronized; and means for coupling said sources to opposite sides of said intermediate terminal on said impedance.

6. In television synchronization, means for increasing sharpness of an electrical pulse waveform comprising; a transformer having input and output connections; means for applying an energy wave of sufficient amplitude to the input connection of said transformer, to saturate its core on the peaks of said wave; a rectifier circuit connected across the output connections of the transformer; a capacitative load on the rectifier; a resistive load in shunt with the capacitative load, and an impedance; the size of said resistive load being such in relation to the size of the capacitative load that impulses of a frequency of the order of the applied wave appear in said impedance; said capacitative load and said impedance being in series in said rectifier circuit.

7. In television synchronization, a source of quasi-sinusoidal waveform, and means for producing short quasi-rectangular unidirectional electrical impulses in syntony with said waveform, said means comprising; a transformer having input and output connections; non-oscillatory and non-resonant means connected to said source and to the transformer input, adapted for passing electrical energy only during brief periods occurring near the maximum amplitude of each half cycle alternation of said waveform, a rectifier connected to the output of said transformer; and an output circuit for said rectifier, in which said unidirectional impulses may flow.

HARRY R. LUBCKE.